P. J. RIVERS.
AUTOMOBILE WHEEL.
APPLICATION FILED MAY 9, 1910.
1,017,171.
Patented Feb. 13, 1912.
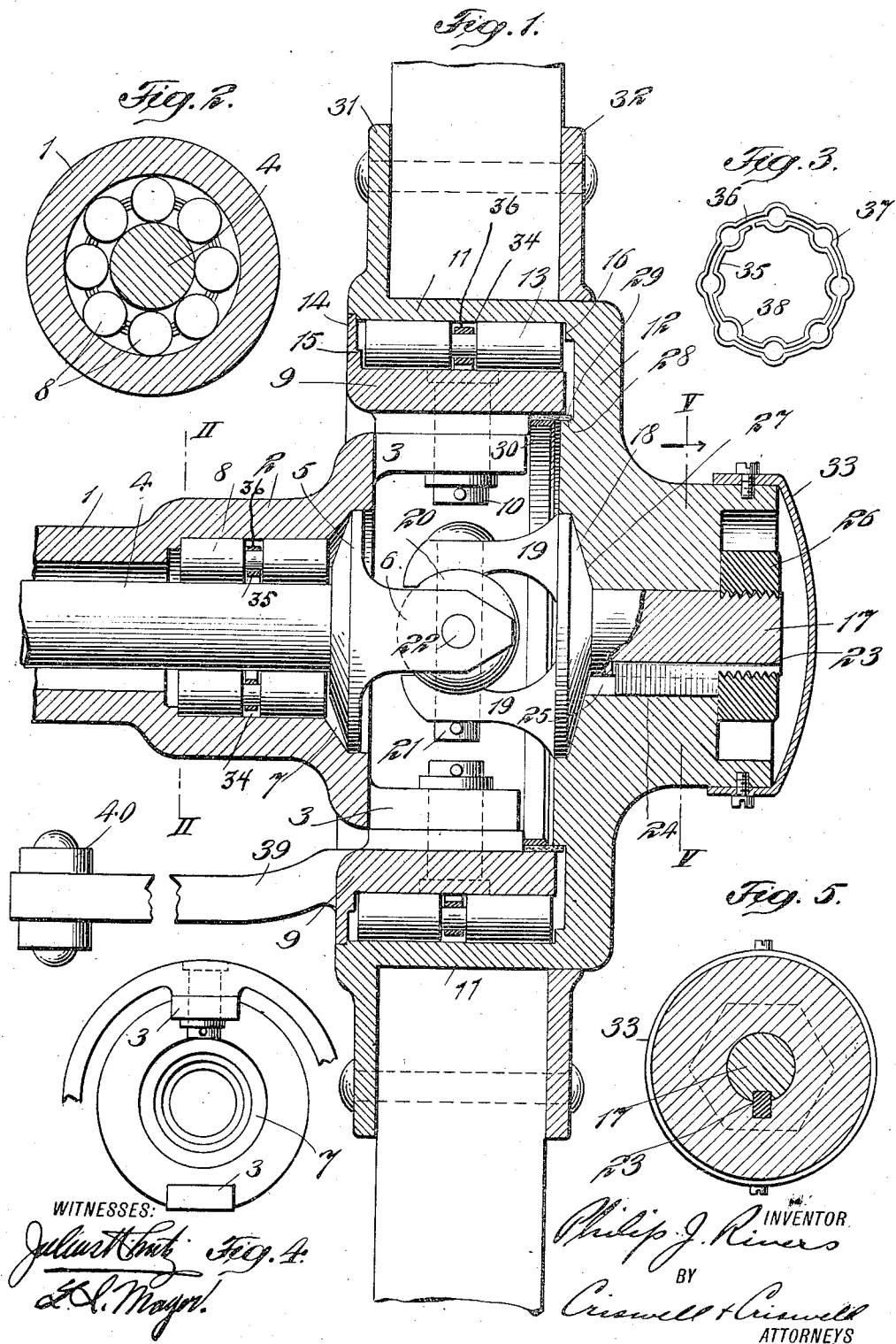

UNITED STATES PATENT OFFICE.

PHILIP J. RIVERS, OF NEW ROCHELLE, NEW YORK.

AUTOMOBILE-WHEEL.

1,017,171.     Specification of Letters Patent.     Patented Feb. 13, 1912.

Application filed May 9, 1910. Serial No. 560,200.

*To all whom it may concern:*

Be it known that I, PHILIP J. RIVERS, a citizen of the United States, and a resident of New Rochelle, county of Westchester, and State of New York, have invented certain new and useful Improvements in Automobile-Wheels, of which the following is a full, clear, and exact description.

The main object of this invention is to provide an automobile wheel with a knuckle joint embodied within the hub of the wheel, the said joint being in a vertical plane passing through the middle of the tread of the wheel whereby in turning the wheel on the said axis, the pivotal point of the wheel will be in the center of that portion of the wheel tread bearing on the wheel supporting surface. The purpose of this is to prevent the lateral shifting or sliding of the wheel, which is necessary where the axis of the knuckle joint is outside of the plane of the wheel or offset from a vertical plane passing through the middle of the wheel tread.

Another object of the invention is to provide a simple and effective universal joint for connecting the driving shaft to the wheel.

Another object of the invention is to provide simple means for holding the rollers of the roller bearings in their proper relative positions so that all of the said rollers may be removed from the bearings and retained in their relative operative positions.

With these and other objects in view, the invention will be hereinafter more particularly described with reference to the accompanying drawings, which form a part of this specification, and will then be pointed out in the claim at the end of the description.

In the drawings, Figure 1 is a vertical sectional view of the wheel hub showing the driving shaft connected thereto and a portion of the casing inclosing said shaft; Fig. 2 a transverse sectional view on the line II—II of Fig. 1; Fig. 3 a detail view of the roller-holding device; Fig. 4 a detail elevation of the end of the drive shaft casing showing a portion of the stationary bearing ring connected thereto; and Fig. 5 a transverse vertical sectional view of the hub on the line V—V of Fig. 1.

Referring to the various parts by numerals, 1 designates the axle casing provided at each of its ends with the enlargement 2 and with the outwardly-extending lugs 3, said lugs being arranged at the upper and lower edges of the said enlargement. Extending through the casing 1 is a shaft or axle 4 which is provided at each of its ends with the disk-like enlargement 5, said enlargement being formed with the outwardly-extending arms 6 which form one member of the universal joint. The axle casing is formed with a recess 7 at its inner end which is adapted to receive the enlargement 5 of the axle. In the axle casing is arranged a roller bearing 8. The disk 5 forms a dust-guard for the bearing 8 and prevents the entrance of dirt and dust therein.

Secured to the lugs 3 is a non-rotatable bearing ring 9, said ring being secured in position by means of pins 10 which pass inwardly through said ring and through the lugs 3. These pins form vertical pivots on which the said bearing ring may swing and the axis of these pins pass through the middle of said ring, for a purpose which will more fully hereafter appear. Surrounding the bearing ring and spaced therefrom a suitable distance, is a hub bearing ring 11, said ring extending inwardly from the main body 12 of the hub. Interposed between the non-rotatable bearing ring and the rotatable hub bearing ring is a roller bearing 13 which supports the wheel and on which the wheel rotates. The non-rotatable bearing ring is formed at its inner end with an annular outwardly-extending flange 14 which forms a dust-guard for the inner side of the roller bearing, said flange fitting against a shoulder formed on the inner edge of the hub ring. To hold the rollers centrally disposed between the bearing rings, the non-rotatable ring is formed with a shoulder 15 and the rotatable ring is formed with a shoulder 16, said shoulders preventing any undue lateral shifting of the rollers.

The main body of the hub is bored axially to receive a stem 17, which is formed at its inner end with the enlarged disk 18. This disk is provided with the inwardly-extending arms 19 which correspond with the arms 6 of the disk 5 and form the other member of the universal joint, said arms being disposed at right angles to the arms 6. Embraced by the arms 6 and 19 is a ball 20, the arms 19 being connected to said ball by means of a pin 21 and the arms 6 being connected thereto by the studs 22. The inner surfaces of the arms 19 and 6 are concave to adapt them to embrace the ball and to prevent the longitudinal movement of the said arms to disconnect them from the ball. It is clear from Fig. 1, that the arms 19 can only be disconnected from the ball by moving said arms laterally with respect to the spindle 17; this is also true of the arms 6. This is important for the reason that it prevents the accidental disconnection of the universal joint while the wheel is assembled, even should the pin 21 or the studs 22 be broken or detached.

The outer end of the spindle 17 is threaded, and said spindle is grooved, as at 23, to receive a key 24. The adjoining part of the hub 12 is grooved, as at 25, to receive a portion of the said key whereby the spindle will be keyed to the hub and will turn with it. The outer end of the key is reduced and threaded to correspond with the threaded end of the spindle 17. A nut 26 is screwed on the end of the spindle 17 and engages the threaded end of the key 24 for the purpose of drawing the beveled surface 27 of the disk 18 against a corresponding beveled surface on the inner face of the hub. This nut also engages the threaded end of the key and locks the key in position.

The center of the ball 20 of the universal joint is axially in line with the centers of the pins 10 so that the turning points between the two parts of the driving axle and the pins of the hub are in the same vertical line. The spindle 17 forms a part of the driving axle 4, the two parts of said axle being connected together by means of the universal joint.

The hub 12 is formed on its inner face with an annular shoulder 28 against which an annular dust-excluding washer 29 rests, said washer being carried by the non-rotatable bearing ring and being held in position by an expanding ring 30. By means of this washer and the flange 14, dust will be effectually excluded from the bearing 13.

From the inner edge of the rotatable bearing ring an annular spoke-supporting flange 31 extends, said flange being preferably formed integral with the rotatable bearing ring. A removable flange 32 secures the inner ends of the spokes in position on the hub, said flange being bolted to the flange 21 by any suitable means.

A dust cap 33 is secured to the outer end of the hub, and it will, of course, be understood that any suitable form of dust-excluding device may be employed to close the inner side of the non-rotatable bearing ring.

The rollers 8 and 13 are reduced in diameter midway between their ends to form the grooves 34 to receive the roller-holding rings 35 and 36. The outer ring 36 is formed with the bearing portions 37 to receive the reduced parts of the rollers, and said ring is continuous, that is to say; it is not a split ring. The inner ring is formed with bearing portions 38 which are adapted to fit around the inner side of the reduced portion of the roller, and this ring is a split ring which may be reduced in diameter to enable it to be placed within the grooves 34. It will, of course, be understood that when the two rings are in position, the rollers will be held spaced apart a suitable distance and will be maintained in that position at all times. It is also manifest that when the rollers are secured within the rings, the entire roller bearing may be moved without disturbing the relative positions of the rollers. This is a great advantage in assembling wheels and in taking them apart for cleaning and repair.

Connected to the non-rotatable bearing ring 9 is a steering arm 39 which may be connected by a rod 40 to any suitable form of steering means.

From the foregoing, it is manifest that I provide a steering wheel wherein the axis of lateral movement is directly over the point of contact between the wheel and its supporting surface, and that, therefore, the wheel turns as on a center and has no lateral or swinging movement at the point of contact between the wheel tread and the supporting surface. This is manifestly of great advantage as it relieves the tire of the excessive strain brought upon it by bodily shifting it or twisting it over the supporting surface during the steering operations. Another great advantage of this construction is that that when the wheel strikes stones or other obstructions, there is no tendency of the wheel to swing around on the knuckle joint as the supporting point and the axis of lateral swinging movement is within the plane of the wheel. It is manifest that this wheel may be used as a steering wheel or as a drive wheel. It is particularly well adapted for heavy trucks wherein the drive mechanism is connected to the fore wheels. It will, of course, be understood that any suitable form of driving mechanism, either a chain or shaft drive, may be connected to the axle 4.

Having thus described my invention, I claim as new and desire to secure by Letters Patent:—

A wheel comprising a hub provided with an inwardly projecting spoke receiving ring, said ring being provided on its inner surface with end shoulders, said hub having its inner face provided with an annular shoulder, a non-rotatable bearing ring within the spoke ring and spaced therefrom, said bearing ring being provided with a flange for engaging one of the shoulders of the spoke ring, antifriction bearings interposed between the spoke and bearing rings and engaging the shoulder of the bearing ring and one of the shoulders of the spoke ring, a washer seated on the hub shoulder and engaging the bearing ring, a resilient ring for holding the washer in contact with the bearing ring, an axle casing having end arms, means for pivotally connecting the arms to the bearing ring, an axle projecting through the casing and provided with end arms, a spindle carried by the hub and provided with end arms, and means for universally connecting the axle and spindle arms.

This specification signed and witnessed this 2nd day of May A. D. 1910.

PHILIP J. RIVERS.

Witnesses:
W. A. TOWNER, Jr.,
L. I. MAYER.

Copies of this patent may be obtained for five cents each, by addressing the "Commissioner of Patents, Washington, D. C."